United States Patent [19]

De Haan et al.

[11] Patent Number: 4,607,812
[45] Date of Patent: Aug. 26, 1986

[54] HINGE MECHANISM FOR AN AIRCRAFT DOOR

[75] Inventors: Frans W. De Haan, Mijdrecht; John Blackburn, Uithoorn, both of Netherlands

[73] Assignee: Fokker B.V., Netherlands

[21] Appl. No.: 541,105

[22] Filed: Oct. 12, 1983

[30] Foreign Application Priority Data

Oct. 13, 1982 [NL] Netherlands ............... 8203956

[51] Int. Cl.⁴ ............................................. B64C 1/14
[52] U.S. Cl. ................................................ 244/129.5
[58] Field of Search .................... 244/129.4, 129.5; 49/246; 16/366, 368

[56] References Cited

U.S. PATENT DOCUMENTS 2,751,636  6/1956  Heinemann et al. ............. 244/129.5
3,085,297  4/1963  Linderfelt ....................... 244/129.5

FOREIGN PATENT DOCUMENTS 505691  8/1930  Fed. Rep. of Germany ........ 49/246

Primary Examiner—Trygve M. Blix
Assistant Examiner—Rodney Corl
Attorney, Agent, or Firm—Handal & Morofsky

[57] ABSTRACT

Aircraft door of the type which during the flight is pressed all around against the door case under influence of the cabin pressure. During opening and closing the door moves by means of a hinge mechanism with two mutually parallel rotational axes and an intermediate hinge part, one of the rotational axis being connected to the door and the other being connected to the door case. When the door is opened during a first motion phase the intermediate hinge part carries out a rotational movement around the rotational axis connected to the door case whereby simultaneously the angle between the door and the intermediate hinge part is decreased, and thereafter in a second motion phase the intermediate hinge part carries out a rotational movement in the opposite direction around the rotational axis connected to the door case. When the door is closed these movements are carried out with reversed rotational directions and in reverse order. A hydraulic or mechanical transmission mechanism is present in the hinge construction coupled with the two rotational axes for coordinating the rotation around both rotational axes in the first motion phase.

7 Claims, 4 Drawing Figures

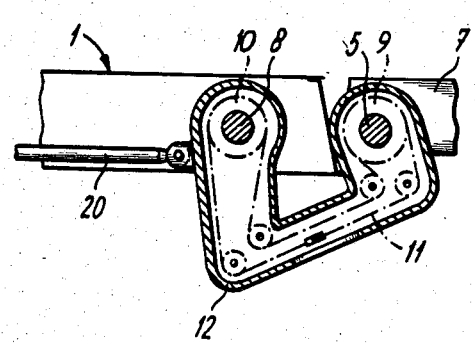
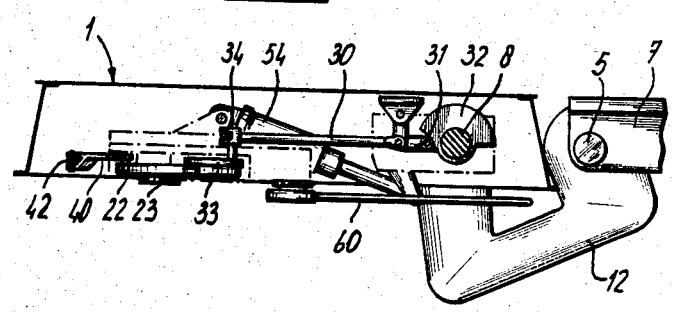
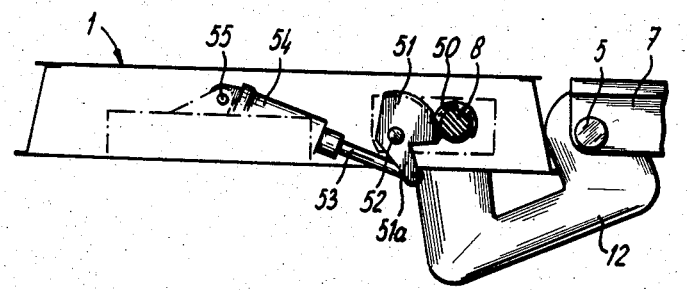

HINGE MECHANISM FOR AN AIRCRAFT DOOR

The invention relates to an aircraft door of the type which during the flight is pressed all around against the door case under influence of the cabin pressure, which door during opening and closing thereof moves by means of a hinge mechanism with two mutually parallel rotational axes and an intermediate hinge part, one of said rotational axes being connected to the door and the other being connected to the door case, such that when the door is opened during a first motion phase the intermediate hinge part carries out a rotational movement around the rotational axis connected to the door case whereby simultaneously the angle between the door and said intermediate hinge part is decreased and thereafter in a second motion phase said intermediate hinge part carries out a rotational movement in the opposite direction around the rotational axis connected to the door case, and when the door is closed said movements are carried out with reversed rotational directions and in reverse order.

In the course of the recent aviation history several systems are developed to open, to close and to lock doors. The door to which the underlying invention relates is of the type, which during the flight of the aircraft is pressed all around against the door case under influence of the cabin pressure.

A door of this type is for instance described in the U.S. Pat. No. 4,180,943. This prior art door is as a whole in the condition during the flight both in width and height direction larger than the door case. The door is operated by means of a central handle onto the door. After decoupling a latching mechanism between the door and the door case using said handle and after reducing the height dimension of the door until said dimension is smaller than the height of the door case by pivoting the upper-and/or lower edge parts of the door inwards, the door is released from the door case by rotating said central handle and moves thereafter over a small distance inwards and somewhat sidewards, said sidewards movement in the direction of the door hinge mechanism, until the handle is rotated into the end position. Thereafter the door is rotated out of the aircraft body around the main hinge mechanism. When the door is closed said movements are carried out in the reversed order and in the reversed direction.

The force applied through door handle causing the rotation of the door, such that the door will be opened or closed is through a connecting rod transferred to the door hinge mechanism such that the direction in which said force is applied lies outside the rotational axis of the hinge mechanism.

This prior art door comprises a mechanism to realize the rotation of the door during the actual opening and closing thereof but does not comprise any means to guide the door motion during opening or closing in relation to the door case as fixed point. If a known aircraft door comprises any guiding mechanisms, then these mechanisms are completely or at least partly contained in one or both door posts.

A further objection against the prior art aircraft doors of this type is, that, if these doors comprise mechanisms for powering the door motion in case of emergencies, said mechanisms are also at least partly installed within the aircraft hull in the proximity of the door post, or actually in the door post, with the necessity to use often rather complex coupling means between this mechanism in the aircraft hull and the corresponding mechanism within the door. In most cases this results also into a rather complicated embodiment of the sealing means of the door.

An object of the invention is now to locate all mechanism concerned in the opening or closing of the door within the door itself. By that the mechanisms can be embodied very compact and it becomes possible to fabricate and test the complete door as one integral construction. Thereafter the door can be mounted into an airplane as finished product.

In agreement with said object the aircraft door according to the invention is characterized in that an hydraulical or mechanical transmission mechanism is present into the hinge construction coupled with the two rotational axes for coordinating the rotation around both rotational axes in the first motion phase.

In a preferred embodiment of the invention the hinge mechanism comprises sprocket wheels each coupled to one of the rotational axes, which sprocket wheels carry an endless chain, whereby the sprocket wheel at the side of the door case cannot rotate in relation to said door case, and the sprocket wheel within the door cannot rotate in relation to said door in the first motion phase and can rotate in relation to the door in the second motion phase.

By means of the mechanical or hydraulical transmission the rotation around both rotational axes within the first motion phase is coordinated. Eventually the number of teeth of said sprocket wheels is unequal or the hydraulic motors are not controlled in the same way. By that the orientaion of the door in each stage in the first motion phase is completely controlled by the transmission mechanism within the hinge mechanism.

According to a preferred embodiment the number of teeth of the sprocket wheel coupled to the rotational axis at the side of the door, is equal to or smaller than the number of teeth of the sprocket wheel coupled to the rotational axis at the side of the door case.

In mechanical embodiments the sprocket wheel coupled to the rotational axis within the door is locked during the first motion phase by means of a ratchet arrangement. At the end of said motion phase, if the door handle is rotated into its end position, said ratchet arrangement is decoupled and the door hinge becomes fixedly positioned in relation to said door.

In the second motion phase the door is able to rotate independently of the sprocket wheel coupled to the rotational axis and the door side or the hydraulic motor at that side. In this motion phase the door is pushed outwards by hand, whereby the position of the door handle is fixed. To prevent that the aircraft personal or the wind slams the door in an undesirable way against the outer wall of the airplane if said door reaches the ultimate position, preferably the swinging movement of the door is damped by means of a piston/cylinder combination mounted within the door, one side thereof being coupled to said door and the other side coupled to the intermediate hinge part.

Because in general the door will sway over an angle which approximates 180° some kind of intermediate transmission means is necessary between the piston/cylinder combination and the intermediate hinge part.

According to a further preferred embodiment in case of emergency the piston/cylinder combination can be coupled to an energy reservoir mounted in said door, for instance a reservoir containing pressurized air, destined to deliver sufficient energy to the door to open said door under the influence of the action of the piston/cylinder combination.

The invention will now be explained in more detail in the following description with reference to the embodiment illustrated in the drawings.

FIG. 2 illustrates a schematical cross sectional view through a number of parts of the hinge mechanism according to line II—II in FIG. 1.

FIG. 3 illustrates schematically a number of parts of the locking mechanism for preventing rotation at the side of the door during the first motion phase according to the line III—III in FIG. 1.

FIG. 4 illustrates schematically a number of parts used for damping or powering the door movement according to line IV—IV in FIG. 1.

Identical parts in the various figures are indicated by identical reference symbols.

Figure 1:
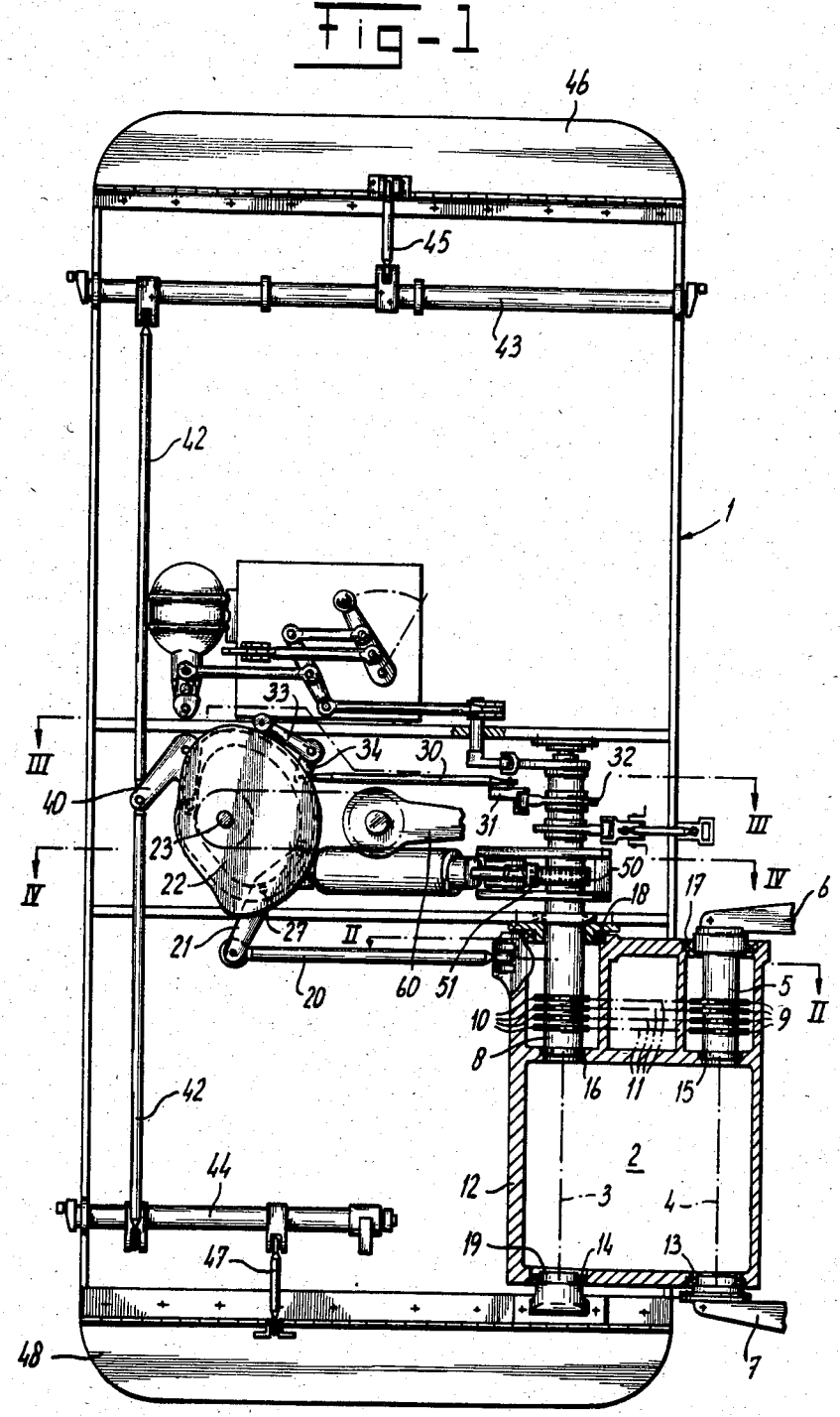
FIG. 1 illustrates an inside view onto the door according to the invention, of which door the lining and plating at the inside is removed to make the mechanism within said door visible.

The door according to the invention is in general indicated by 1 and is suspended to a not in detail illustrated door post by means of the hinge mechanism 2. Said hinge mechanism 2 has 2 pivot shafts extending according to the center lines 3 and 4. The pivot shaft 5 is connected to the door post, of which only the clamps 6 and 7 are schematically indicated. The pivot shaft 8, extending according to the center line 3, is coupled to parts of the hinge mechanism, which will be described hereinafter. A number of sprocket wheels 9 is mounted onto the pivot shaft 5 and a number of sprocket wheels 10 mounted onto the pivot shaft 8, pairwise and in the same plane as the sprocket wheels 9. A number of chains, the number of which corresponds responds to the number of paired sprocket wheels, respectively a so called chain mat, in FIG. 1 schematically indicated by 11, is installed around the sprocket wheels 9 and 10. The intermediate hinge part is in FIG. 1 indicated by 12 and said intermediate part comprises a number of bearings 13, 14, 15, 16, 17 and 18 enabling said intermediate hinge part to rotate around both axes 8 and 5. On the one hand said intermediate hinge part is suspended to the door post clamps 6 and 7 through the bearings 13, 15 and 17 belonging to the first pivot shaft 5 and on the other hand the door is able to rotate around the second pivot shaft 8 through the only schematically indicated pin 19, secured to the door, by means of the bearings 14, 16 and 18.

FIG. 2 illustrates a cross section through said hinge mechanism especially through a pair of sprocket wheels 9, 10 and the corresponding chain 11 and through a coupling rod 20, through which coupling rod a force is applied to the hinge mechanism so that said hinge will rotate in relation to the door and, through the chain, also rotate in relation to the door post.

As will be described in more detail with reference to FIG. 3 during a first phase of the opening motion, the sprocket wheels 10 will be maintained in a fixed position in relation to the door, and because also the sprocket wheels 9 are not enabled to rotate around the axis 4/5 and maintained therefore a fixed position in relation to the door post, the door 1 will take up a predetermined position. If the number of teeth of both sprocket wheels 9 and 10 is equal, then the door 1 will by rotation of the hinge be displaced parallel to itself. If the number of teeth of the sprocket wheels 10 is smaller than the number of teeth of the sprocket wheels 9 then the door 1 will during the rotation around the hinge mechanism in relation to the center line 3, carry out a slight rotational movement in the clockwise direction around said center line 3. If the number of teeth of the sprocket wheels 10 is larger than that of the sprocket wheels 9, then on the contrary the door will carry out a slight rotational movement around the center line 3 in the anti-clockwise direction. By proper choice of the number of teeth of each of the sprocket wheels 9 and 10 a predetermined motion of the door in the first motion phase can be obtained.

Although the above mentioned description an embodiment of a mechanical transmission mechanism is described with relation to the figures it is also possible to realize a hydraulical transmission mechanism. In that case each of the rotational axis is coupled to a hydraulic motor of which the control conduits are interconnected such that the hydraulic motors are simultaneously controlled such that the above described guided door motion during the first motion phase is obtained.

In the second motion phase the hydraulic motor at the door post side will be decoupled by means of the already discussed ratchet arrangement, so that thereafter the second motion phase can be carried out.

As appears from FIG. 1 the rod 20 is through a notch follower rod 21 comprising a roll element coupled to a notched control plate 22, rotatable around the center line 23, whereby said rod 21 is rotatably connected at 27 to the door. By means of a handle, coupled through a chain to the notched plate and positioned outside the plane of the drawing and therefore not visible in FIG. 1, only visible in FIG. 3 and indicated therein by 60, said notched plate 22 is when the door is operated, rotated, so that the coupling point between the follower rod 21 and the rod 20 in FIG. 1 during the first motion phase will be pushed to the right, so that the door will carry out the already described pivotable movement around the hinge mechanism. It will be clear now that the result thereof is that the door is released from the door case and moves appoximately parallel to itself over a short distance sidewards and inwards dependent onto the dimensions of the hinge mechanism.

The auxiliary means maintaining the sprocket wheels 10 into a fixed position during this motion in relation to the door 1 comprise a rod 30, of which one end through the components 33, 34 is coupled to and is controlled by the notch plate 22, and of which the other end is coupled to a movable ratchet element 31 of which one section can cooperate with a counter element 32 secured to the axis 8. During the above mentioned rotation of the notch plate 22 the elements 31 and 32 will cooperate such that a rotation around the axis 8 and therewith a rotation of the sprocket wheels 10 in relation to the door is prevented.

By that it is also possible to enable the door to rotate in the following motion phase around the pivot shaft 8 in the outward direction, so that the door, of which in the meantime the dimensions in height direction are decreased at the upper and under side enabling the door to pass through the door opening, can be swayed outside.

If the first swaying motion of the door is finished, the hinge is locked in relation to the door by means of the rod 20, which not moves anymore through the rod 21 because the roll of rod 21 now runs through a notch of the part 22 having a constant radius. Simultaneously with this locking the ratchet mechanism (FIG. 3) is released by means of 30.

As is already remarked the door is of the type which first of all has to be released from the door by swaying the door inwards, whereby upper and lower edge sections of said door have to be pivoted inwardly, after which it is possible in a next stage of the motion to move the door with the now reduced height and the now varied hinge position through the door opening.

The parts realizing said pivot movement of the pivotable upper and under sections of the door are also indicated in the figure. These parts comprise the notch follower rod 40, coupled to the vertical rod 42 of which the ends are through a hinge mechanism coupled to the locking rod 43 at the upper side and the locking rod 44 at the under side of the door. The locking rod 43 is through a further rod 45 coupled to the pivotable upper section 46 of the door which, as will be clear, is able to move downwards by rotation of the axis 43. In a similar way the lower locking rod 44 is through a coupling rod 47 coupled to the lower pivotable section 48 of the door which, with a rotation of the locking axis 44 is able to move inwards. The locking rods 43 and 44 comprise furthermore at the ends locking elements which will be inserted into locking notches when the door is closed respectively will be released from said notches when the door is opened.

The dimensions of the hinge mechanism are furthermore selected such that the hinge mechanism itself can be rotated around the center line 4 such that the center line 3 can be brought completely outside the hull of the aircraft, in other words such that the door post fits into the space within the U-shaped configuration of the hinge mechanism, enabling a complete outwards swaying of the door and positioning of the door against the outside of the aircraft hull without damaging the sealing strip which extends on or nearby the door cover.

To prevent that the door is pushed outwards with too much weight during the second motion phase of said door the axis 8 comprises a further tooth wheel 50 cooperating with a tooth wheel segment 51 rotatably mounted onto an axis 52 parallel to the axis 8. The tooth wheel segment 51 comprises a lever section 51a of which one end is pivotably coupled to the end of the piston rod 53 of the pneumatical piston/cylinder combination 54. The other end of said piston/cylinder combination 54 is pivotably or rotatably connected to a part of the door 1 at 55.

During the first motion phase, during which phase the door is released from the door case in a guided way and is made ready for the outwards swaying movement the axis 8 is locked in the already mentioned way and therefore the tooth wheel 50 will not move in this motion phase and the pneumatical piston/cylinder combination 54 will not have any function. During the second motion phase however the axis 8 is enabled to rotate in relation to the door. During this motion phase therefor thanks to the cooperation between the tooth wheel 50 coupled to the axis 8, the tooth wheel segment 51 and the pneumatical piston/cylinder combination 54 the swaying movement of said door will be damped.

This damping mechanism can in case of emergency be used for powering the swaying movement of the door. In that case the damping cylinder 54 is coupled to a reservoir 56 of pressurized air (see FIG. 1). This reservoir 56 of pressurized air is through a conduit, not illustrated in the figures, connected to the pneumatical damper 54.

It will be clear that in the above description only a preferred embodiment of a door according to the invention is described and that the invention is not restricted to said embodiment.

We claim:

1. An aircraft door of the type which during flight is pressed all around against a door case under the influence of cabin pressure, which door during opening and closing thereof moves by means of a hinge mechanism with two mutually parallel rotational axes and an intermediate hinge part, one of said rotational axes being connected to the door and the other being connected to the door case, such that when the door is opened during a first motion phase the intermediate hinge part carries out a rotational movement around the rotational aixs connected to the door case, whereby simultaneously the angle between the door and said intermediate hinge part is decreased, and thereafter in a second motion phase said intermediate hinge part carries out a rotational movement in the opposite direction around the rotational axis connected to the door case, and when the door is closed said movements are carried out with reversed rotational directions and in reverse order wherein a hydraulic or mechanical transmission mechanism is present in the hinge structure coupled with the two rotational axes for coordinating the rotation around both rotational axes in the first motion phase and wherein hydraulic means is coupled to both rotational axes of the hinge mechanism, which hydraulic means are hydraulically coupled mutually such that the movement of the door relative to the hinge mechanism and the movement of the hinge mechanism relative to the door case is defined at least during the first motion phase and wherein the movement of the door during the second motion phase is damped by means of a piston/cylinder combination mounted within the door, with one side coupled to the intermediate hinge part.

2. An aircraft door of the type which during flight is pressed all around against a door case under the influence of cabin pressure, which door during opening and closing thereof moves by means of a hinge mechanism with two mutually parallel rotational axes and an intermediate hinge part, one of said rotational axes being connected to the door and the other being connected to the door case, such that when the door is opened during a first motion phase the intermediate hinge part carries out a rotational movement around the rotational axis connected to the door case whereby simultaneously the angle between the door and said intermediate hinge part is decreased, and thereafter in a second motion phase said intermediate hinge part carries out a rotational movement in the opposite direction around the rotational axis connected to the door case, and when the door is closed said movements are carried out with reversed rotational directions and in reverse order wherein a hydraulic or mechanical transmission mechanism is present in the hinge structure coupled with the two rotational axes for coordinating the rotation around both rotational axes in the first motion phase and wherein hydraulic means is coupled to both rotational axes of the hinge mechanism, which hydraulic means are hydraulically coupled mutually such that the movement of the door relative to the hinge mechanism and the movement of the hinge mechanism relative to the door case is defined at least during the first motion phase and further comprising a piston/cylinder combination at one side hingedly connected to one end of a connecting arm of which the center is rotatably supported, and at the other end connected through a transmission mechanism to the rotational axis of the hinge at the door side.

3. An aircraft door of the type which during the flight is pressed all around against the door case under the influence of cabin pressure, which door during opening and closing thereof moves by means of a hinge mechanism with two mutually parallel rotational axes and an intermediate hinge part, one of said rotational axes being connected to the door and the other being connected to the door case, such that when the door is opening during a first motion phase the angle between the door and the intermediate hinge part is decreased, and thereafter in a second motion phase said intermediate hinge part carries out a rotational movement around the rotational axis connected to the door case whereby simultaneously the angle between the door and said intermediate hinge part carries out a rotational movement in the opposite direction around the rotational axis connected to the door case, and when the door is closed said movements are carried out with reversed rotational directions and in reverse order, whereby a hydraulic transmission mechanism is present in the hinge construction coupled with the two rotational axes for coordinating the rotation around both rotational axes in the first motion phase, comprising two hydraulic motors each coupled to one of the rotational axes of the hinge mechanism, which motors are hydraulically mutually coupled such that the movement of the door relative to the hinge mechanism and the movement of the hinge mechanism relative to the door case is defined at least during the first motion phase and the coupling between the hydraulic motor at the side of the door case and the corresponding rotational axis is released during the second motion phase and wherein the movement of the door during the second motion phase is damped by means of a piston/cylinder combination mounted within the door, with one side coupled to said door and with the other side coupled to the intermediate hinge part.

4. An aircraft door of the type which during flight is pressed all around against a door casing under influence of cabin pressure, which door during opening and closing thereof moves by means of a hinge mechanism with two mutually parallel rotational axes and an intermediate hinge part, one of said rotational axes being connected to the door and the other being connected to the door case, such that when the door is opened during a first motion phase the intermediate hinge part carries out a rotational movement around the rotational axis connected to the door case whereby simultaneously the angle between the door and said intermediate hinge part is decreased, and thereafter in a second motion phase said intermediate hinge part carries out a rotational movement in the opposite direction around the rotational axis connected to the door case, and when the door is closed said movements are carried out with reversed rotational directions and in reverse order, a transmission mechanism present in the hinge construction coupled with the two rotational axes for coordinating the rotation around both rotational axes in the first motion phase, the hinge mechanism comprising sprocket wheels each coupled to one of the rotational axes, which sprocket wheels carry an endless chain, the sprocket wheel at the side of the door not rotating in relation to said door case, the sprocket wheel coupled to the rotational axis within the door being locked during the first motion phase by means of a ratchet arrangement which during the second motion phase is decoupled by means of the door operating mechanism such that the sprocket wheel within the door cannot rotate in relation to said door in the first motion phase and can rotate in relation to the door in the second motion phase.

5. A door according to claim 4, wherein the movement of the door during the second motion phase is damped by means of a piston/cylinder combination mounted within the door, with one side coupled to said door and with the other side coupled to the intermediate hinge part.

6. A door according to claim 5 or 3, wherein the piston/cylinder combination is at the one side hingedly connected to one end of the connecting arm of which the center is rotatably supported, and of which the other end is connected through a transmission mechanism to the rotational axis of the hinge at the door side.

7. A door according to claim 5 or 3, wherein in case of emergency the piston/cylinder combination can be coupled to an energy reservoir mounted in said door, for instance a reservoir containing pressured air, and capable of delivering sufficient energy to the door to open said door under the influence of the action of the piston/cylinder combination.

* * * * *